(12) United States Patent
Nakamura et al.

(10) Patent No.: US 8,405,845 B2
(45) Date of Patent: Mar. 26, 2013

(54) IMAGE FORMING APPARATUS, IMAGE FORMING METHOD, AND COMPUTER PROGRAM PRODUCT

(75) Inventors: Rie Nakamura, Shizuoka (JP); Miki Ouchi, Kanagawa (JP); Daisuke Noguchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 669 days.

(21) Appl. No.: 12/623,770

(22) Filed: Nov. 23, 2009

(65) Prior Publication Data

US 2010/0134820 A1 Jun. 3, 2010

(30) Foreign Application Priority Data

Nov. 28, 2008 (JP) ................................. 2008-305338

(51) Int. Cl.
*G06K 15/00* (2006.01)
(52) U.S. Cl. ...................... 358/1.14; 358/1.16
(58) Field of Classification Search .................. 358/1.9, 358/474, 1.14, 1.3, 443, 450, 1.16
See application file for complete search history.

(56) References Cited

U.S. PATENT DOCUMENTS

| | | | | |
|---|---|---|---|---|
| 4,352,980 A * | 10/1982 | Hibari | ............................. | 377/53 |
| 6,643,028 B1 * | 11/2003 | Ogura et al. | .................. | 358/1.6 |
| 6,892,207 B2 * | 5/2005 | McKay et al. | ......................... | 1/1 |
| 7,697,154 B2 * | 4/2010 | Ohue | ............................ | 358/1.15 |
| 8,285,644 B2 * | 10/2012 | Kasahara | ........................ | 705/51 |
| 2002/0140960 A1 * | 10/2002 | Ishikawa | ....................... | 358/1.13 |
| 2005/0007630 A1 * | 1/2005 | Ogawa et al. | ................ | 358/1.15 |
| 2006/0064297 A1 * | 3/2006 | Sugishita et al. | ............... | 703/24 |
| 2006/0262340 A1 * | 11/2006 | Lee | ............................... | 358/1.14 |
| 2006/0282684 A1 | 12/2006 | Kakoi et al. | | |
| 2007/0229926 A1 * | 10/2007 | Morisaki et al. | .............. | 358/527 |

FOREIGN PATENT DOCUMENTS

| JP | 363143568 | * | 6/1988 |
|---|---|---|---|
| JP | 2003-308481 | | 10/2003 |
| JP | 2007-74088 | | 3/2007 |
| JP | 2008-199428 | | 8/2008 |

\* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

An accumulating unit accumulates image data of an original read by a reading unit. A combining unit combines the image data accumulated in the accumulating unit in a single printing sheet according to a predetermined copy mode. An output unit prints and outputs the image data according to the copy mode. An input unit receives an input of a read instruction. When a total number of originals read by the reading unit is smaller than a total number of originals specified in the copy mode and when the input unit does not receive an input of the read instruction within a predetermined time, a discard determining unit discards the image data accumulated in the accumulating unit, and finishes a printing process.

16 Claims, 16 Drawing Sheets

(a)                                       (b)

(a)                                       (b)

(a)                                       (b)

PRESS TEST COPY

READING COMPLETED

IMAGE FORMING APPARATUS, IMAGE FORMING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-305338 filed in Japan on Nov. 28, 2008.

BACKGROUND OF THE INVENTION

1. Field of the Invention

The present invention relates to an image forming apparatus, an image forming method, and a computer program product, and more particularly, to an image forming apparatus, an image forming method, and a computer program product with a capability of avoiding wasteful printing by reliably executing combined copy of originals including personal information.

2. Description of the Related Art

Conventionally, a technique for reading and combining a plurality of originals to integrate these into one sheet of paper, and printing these in one copy (hereinafter, "combined copying") has been known. The reading of plural originals is performed by automatically feeding the originals using an auto document feeder or the like, or by manually placing originals on an original glass to read the originals one by one. An original having a shape that cannot be fed by an ADF such as an ID card is generally placed manually on the original glass to read it.

In combined copying in which originals are manually arranged on an original glass and read one by one, the apparatus cannot automatically determine whether reading of all originals has been completed. Therefore, completion of reading of all the originals is informed to the apparatus by setting a predetermined read time in advance or by triggering by a user by pressing a specific button or the like. Specifically, when reading of the next original is not started within the predetermined read time or a trigger is not generated, the apparatus determines that the reading is completed, and starts printing.

Recently, there are many occasions on which a document such as a driving license including personal information written thereon is copied by a copying machine and the copied document is used for personal authentication. When a document including personal information is to be copied, particular attention is needed to prevent unauthorized use and leakage of the personal information. Therefore, an image processing technique for copying documents including personal information has been developed.

For example, in an image processing apparatus described in Japanese Patent Application Laid-open No. 2007-074088, when an original of a predetermined size including personal information is copied, only a desired information element included in the original is selectively output. Specifically, by holding a coordinate position of personal information included in the original of a predetermined size (a driving license or the like), processing such as masking is performed with respect to the information to be protected and then a copied document is output.

Further, an image processing apparatus described in Japanese Patent Application Laid-open No. 2008-199428 specifies a type of information medium by calculating the size of the information medium from an input image, to determine a position of a characteristic image expressing personal information according to the type of the information medium, and masks an area where the characteristic image is present. Thus, it is possible to prevent copying of undesired images.

However, in the image processing apparatuses described in the above patent documents, although printing of undesired images is prevented, it cannot be prevented that personal information is erroneously printed when read and accumulation of image data are not completed. That is, when originals are manually placed one by one on an original glass to read originals and a plurality of read originals are combined and copied, output may be performed with only image data elements already accumulated even if read has not been completed yet, because the apparatus cannot correctly determine the completion of read. The image processing apparatuses described in the above patent documents do not consider prevention of such cases.

Management of documents including personal information is important, and generation of unnecessary copies is not desired. Therefore, it is desired to perform printing only when reading and accumulation of image data are completed and to prevent generation of unnecessary copies.

SUMMARY OF THE INVENTION

It is an object of the present invention to at least partially solve the problems in the conventional technology.

According to one aspect of the present invention, there is provided an image forming apparatus including: a reading unit that electronically reads an original that is placed on a platen; an accumulating unit that accumulates image data of the original read by the reading unit; a combining unit that combines the image data accumulated in the accumulating unit in a single printing sheet according to a predetermined copy mode that specifies in advance a total number of originals to be read; an output unit that prints and outputs the image data according to the predetermined copy mode; an input unit that receives an input of an instruction; a discard determining unit that discards the image data accumulated in the accumulating unit, when a total number of originals read by the reading unit is smaller than the total number of originals specified in advance in the predetermined copy mode and when the input unit does not receive an input of a read instruction within a predetermined time, and finishes a printing process.

Furthermore, according to another aspect of the present invention, there is provided an image forming method executed by an image forming apparatus. The image forming method includes: reading including a reading unit reading electronically an original that is placed on a platen; accumulating including an accumulating unit accumulating image data of the original read by the reading unit; determining including a determining unit determining whether a total number of originals read by the reading unit has reached a total number of originals specified in advance in a predetermined copy mode; and data processing including a data processing unit discarding, when it is determined that the total number of originals read by the reading unit has not reached the total number of originals specified in advance in the predetermined copy mode, if reading of another original is not performed by the reading unit within a predetermined time, the image data accumulated in the accumulating unit and finishing a printing process, and combining, when it is determined that the total number of originals read by the reading unit has reached the total number of originals specified in advance in the predetermined copy mode, the image data accumulated in the accumulating unit in a single printing sheet according to the predetermined copy mode; and outputting including an output unit printing and outputting combined image data according to the predetermined copy mode.

Moreover, according to still another aspect of the present invention, there is provided a computer program product including a computer-usable medium having computer-readable program codes embodied in the medium for implementing an image forming method executed by an image forming apparatus. The program codes when executed cause a computer to execute: reading including a reading unit reading electronically an original that is placed on a platen; accumulating including an accumulating unit accumulating image data of the original read by the reading unit; determining including a determining unit determining whether a total number of originals read by the reading unit has reached a total number of originals specified in advance in a predetermined copy mode; and data processing including a data processing unit discarding, when it is determined that the total number of originals read by the reading unit has not reached the total number of originals specified in advance in the predetermined copy mode, if reading of another original is not performed by the reading unit within a predetermined time, the image data accumulated in the accumulating unit and finishing a printing process, and combining, when it is determined that the total number of originals read by the reading unit has reached the total number of originals specified in advance in the predetermined copy mode, the image data accumulated in the accumulating unit in a single printing sheet according to the predetermined copy mode; and outputting including an output unit printing and outputting combined image data according to the predetermined copy mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image forming apparatus, an image forming method, and an image forming program according to the present invention will be explained below in detail with reference to the accompanying drawings.

Figure 1:
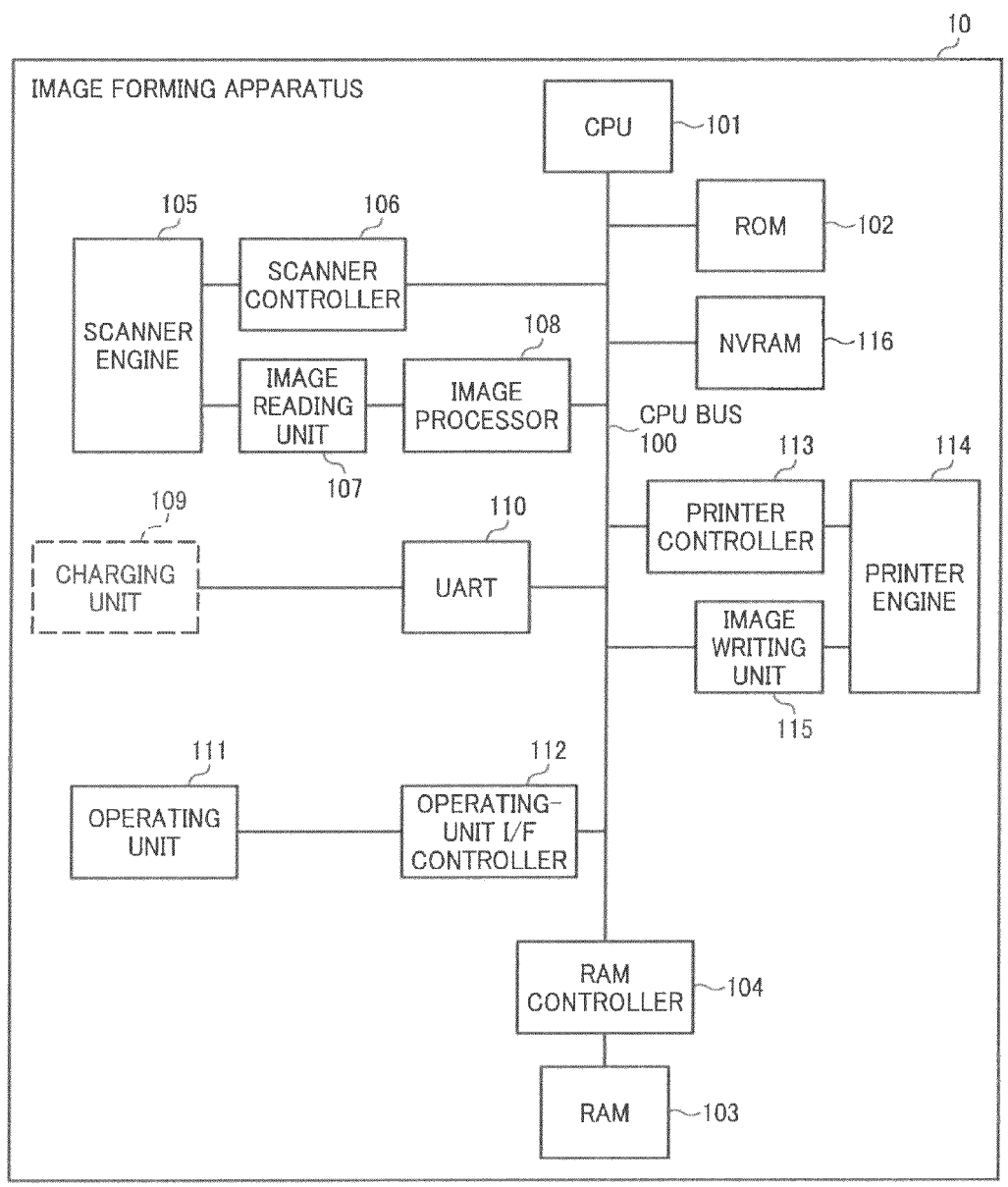
FIG. 1 is a block diagram of an image forming apparatus according to a first embodiment of the present invention.

FIG. 1 is a block diagram of an image forming apparatus according to a first embodiment of the present invention. An image forming apparatus 10 shown in FIG. 1 has a copy function, and includes a CPU bus 100, a central processing unit (CPU) 101, a read-only memory (ROM) 102, a random access memory (RAM) 103, a RAM controller 104, a scanner engine 105, a scanner controller 106, an image reading unit 107, an image processor 108, a charging unit 109, an universal asynchronous receiver transmitter (UART) 110, an operating unit 111, an operating-unit I/F controller 112, a printer controller 113, a printer engine 114, an image writing unit 115, and a non-volatile RAM (NVRAM) 116.

The CPU 101 issues an instruction to the respective units via the CPU bus 100 to control the respective units. The CPU 101 can be singular or plural, and can improve processing performance by incorporating plural CPUs. A program to be executed by the image forming apparatus 10 is stored in the ROM 102. The RAM 103 is connected to the CPU 101 and the like via the RAM controller 104, and temporarily stores processing data of the respective units. The NVRAM 116 is a non-volatile memory, and holds information specific to a device (such as a counter value of the number of copies).

The scanner engine 105 is a mechanism for reading images, and reads original images under control of the scanner controller 106. The data of the read original image is transmitted to the image reading unit 107, and processing such as digital signal processing is appropriately performed with respect to the data by the image processor 108.

The printer engine 114 is a mechanism for receiving an input of print data from the image writing unit 115 under control of the printer controller 113 and printing the image. The printer engine 114 can form an image by a system such as a laser system, LED system, or inkjet printing system.

The operating unit 111 is a man-machine interface that receives an input from a user of the image forming apparatus 10 under control of the operating-unit I/F controller 112 and presents information to the user. The operating unit 111 includes a button for operating the device and an indicator (a display such as a light emitting diode (LED) and a liquid crystal display (LCD), a speaker or the like) for displaying a status of the device.

The charging unit 109 includes a CPU (not shown) and a display unit (not shown) incorporated therein, receives an input of money, and displays the balance. The CPU in the charging unit 109 and the CPU 101 are connected with each other via the UART 110 and the CPU bus 100. Accordingly, the CPU 101 obtains amount information of the money received by the charging unit 109 and notifies the charging unit 109 of the balance. The charging unit 109 operates the image forming apparatus only when a predetermined fee is input, and can be omitted. The charging unit 109 can be formed of a coin rack or the like.

In the image forming apparatus 10, the scanner engine 105 also functions as a reading unit that electronically reads an original on a platen. The RAM 103 also functions as an accumulating unit that accumulates image data of the original read by the reading unit. The image processor 108 also functions as a combining unit that combines the pieces of image data accumulated in the accumulating unit. The printer engine 114 also functions as an output unit that prints the image data. The operating unit 111 also functions as an input unit that receives an input of instruction. The CPU 101 also functions as a discard determining unit that discards the image data accumulated in the accumulating unit when a predetermined condition is satisfied, and finishes the process.

Figure 2:
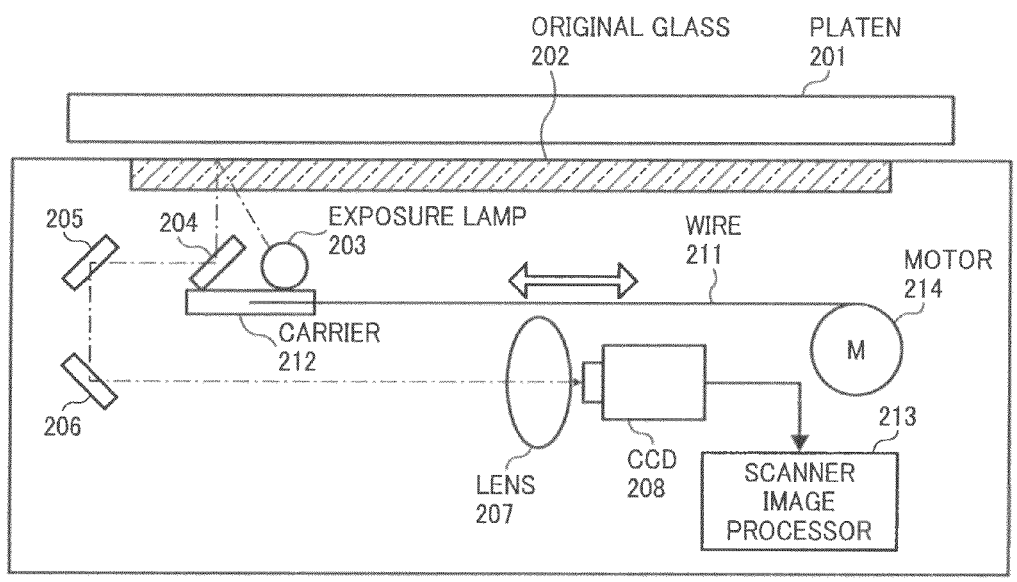
FIG. 2 depicts details of an image reading unit included in the image forming apparatus shown in FIG. 1.

An image reading processor of the image forming apparatus 10, that is, the scanner engine 105, the image reading unit 107, and the image processor 108 are explained in more detail. Details of the image reading processor are shown in FIG. 2. In FIG. 2, a platen 201 is arranged on an original glass 202. The platen 201 presses an original placed on the original glass 202 to protect the original glass 202. An exposure lamp 203 for irradiating light to the original is arranged below the original glass 202. After light irradiated from the exposure lamp 203 is reflected by the original on the original glass 202, the light is reflected by mirrors 204, 205, and 206 to enter into a lens 207, and the light is condensed to form an image on a charge-coupled device (CCD) 208. The CCD 208 converts the imaged light to an analog electric signal, and transmits the signal to a scanner image processor 213 (corresponding to the image processor 108 in FIG. 1). The exposure lamp 203 and the mirror 204 are arranged on a carrier 212, and move in an arrow direction (sub-scanning direction) in FIG. 2 to perform sub-scanning of an original surface as a wire 211 mounted on the carrier 212 is pulled in the arrow direction due to rotations of a motor 214. The image reading processor shown in FIG. 2 is only an example, and other configurations can be adopted.

Figure 3A:
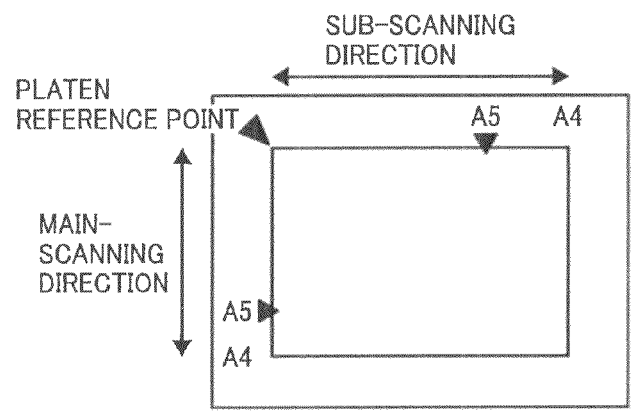
FIG. 3A is a schematic diagram of a read area on an original glass included in the image reading unit shown in FIG. 2.

FIG. 3A depicts the original glass 202 in FIG. 2 as viewed from above. An original read area and a read reference position are specified on an upper surface of the original glass 202. In the first embodiment, the largest size of the read area is assumed as A4, and a left upper end in FIG. 3A is assumed as the read reference position. In FIG. 3A, a horizontal direction is designated as the sub-scanning direction, and a vertical direction is designated as the main scanning direction. It is assumed that a narrow side of the original is set in the main scanning direction. In this case, the read area of A4 original is as shown in FIG. 3B, and the read area of A5 original is as shown in FIG. 3C.

Figure 3B:
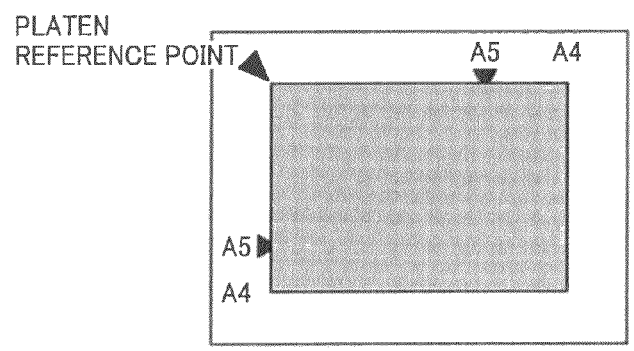
FIG. 3B is a schematic diagram of an A4-compatible read area on the original glass included in the image reading unit shown in FIG. 2.
Figure 3C:
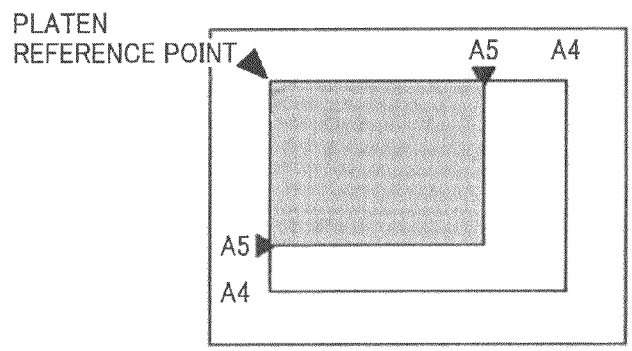
FIG. 3C is a schematic diagram of an A5-compatible read area on the original glass included in the image reading unit shown in FIG. 2.
Figure 4A:
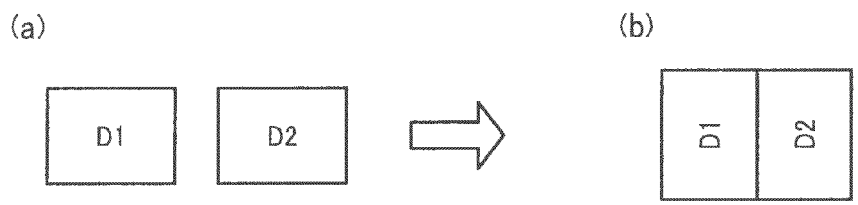
FIG. 4A is an example of an original before combination with the same magnification and a printout after combination with the same magnification.
Figure 4B:
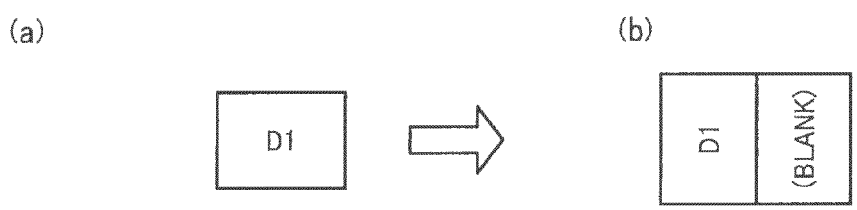
FIG. 4B is another example of an original before combination with the same magnification and a printout after combination with the same magnification.
Figure 4C:
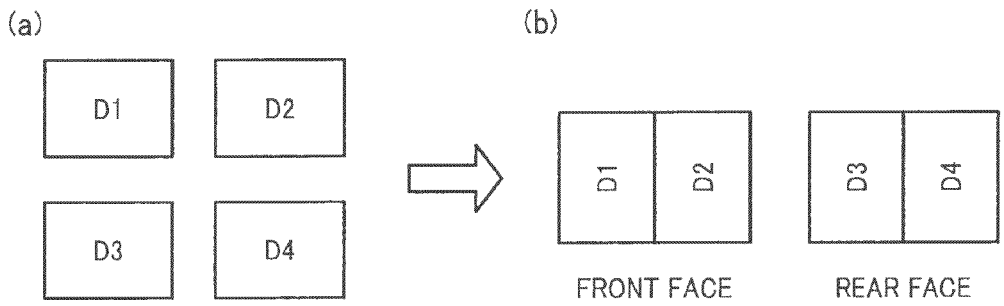
FIG. 4C is still another example of an original before combination with the same magnification and a printout after combination with the same magnification.

Examples when originals are read, combined, and copied via the original glass 202 as shown in FIGS. 3A, 3B, and 3C are shown in FIGS. 4A to 4C. First, when two A5 originals D1 and D2 as shown in (a) in FIG. 4A are placed in the original read area on the original glass 202 one by one and read as shown in FIG. 3C and are combined and copied with the same magnification, an A4-size copy as shown in (b) in FIG. 4A can be obtained. When one A5 original D1 as shown in (a) in FIG. 4B is combined and copied with the same magnification, a lower half of A4-size copying paper is output in blank as shown in (b) in FIG. 4B. When four A5 originals D1, D2, D3, and D4 as shown in (a) in FIG. 4C are combined and copied with the same magnification, D1 and D2 are printed on the front face of the A4 copying paper and D3 and D4 are printed on the rear face thereof, and copies as shown in (b) in FIG. 4C can be obtained. At the time of combined copying with the same magnification, a rotation process of the image is executed as well.

Figure 5:
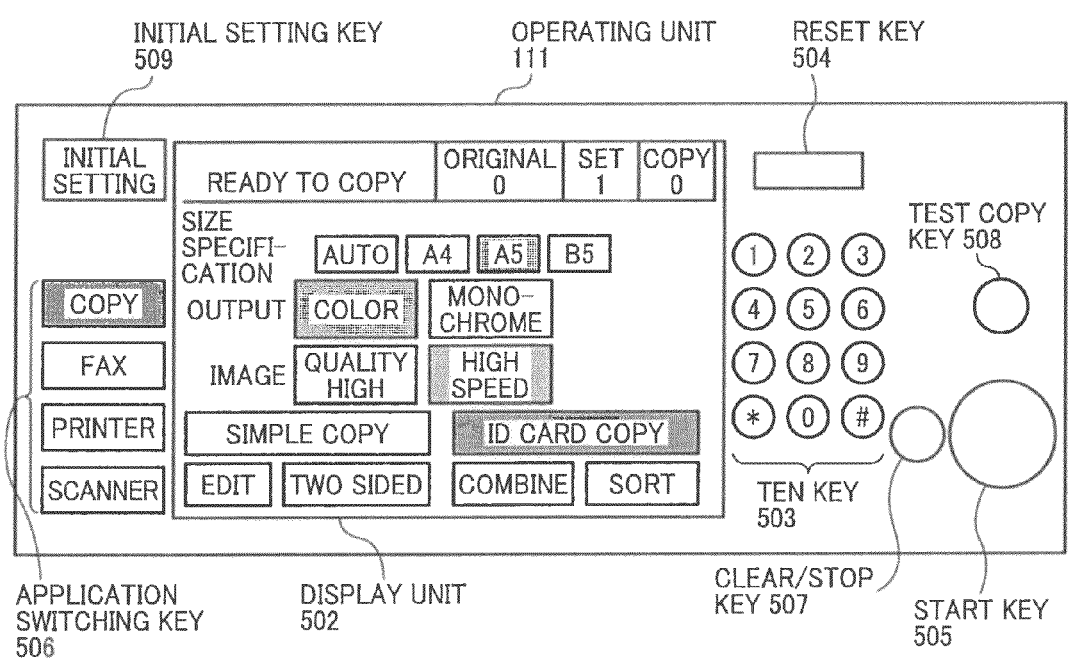
FIG. 5 depicts details of an operating unit included in the image forming apparatus shown in FIG. 1.

Next, a detailed configuration of the operating unit 111 is shown in FIG. 5. As described above, the operating unit 111 functions as an input unit that receives an input from a user and a display unit that presents information to the user. As shown in FIG. 5, the operating unit 111 includes a display unit 502, a ten key 503, a reset key 504, a start key 505, an application switching key 506, a clear/stop key 507, a test copy key 508, and an initial setting key 509. The display unit 502 displays character strings, bit map images and the like. The ten key 503 is used for an input operation of the number of copies of the original and the like. The reset key 504 is used when a mode is reset. The start key 505 is used for an operation for instructing to start copying or reading the original. The application switching key 506 includes four keys of copy, fax, printer, and scanner, and used for switching a copy function, a fax function, a printer function, and a scanner function. The clear/stop key 507 is used for stopping a copy operation or resetting the number of copies. The test copy key 508 is used for an instruction to copy only one sheet for confirming a finishing image after setting the copy parameter. The initial setting key 509 is used for setting an initial value to be used for the copy function, the fax function, the printer function, and the scanner function. The operating unit 111 shown in FIG. 5 is a keyboard formed of hard keys; however, a soft keyboard displayed on a liquid crystal touch panel can be used as well. The respective parts of the operating unit 111 can be appropriately added, changed, or omitted according to functions provided in the image forming apparatus.

In the operating unit 111 shown in FIG. 5, when a user selects "copy" by using the application switching key 506, a copy-parameter setting screen is displayed in the display unit 502 as shown in FIG. 5. The user can select the size of the copy paper, image quality, copy mode, and the like by using the copy-parameter setting screen. In FIG. 5, there are "simple copy" and "ID card copy" as the copy mode. FIG. 5 depicts a state where the user selects "A5", "color", "high speed", and "ID card copy". In the first embodiment, the "ID card copy" mode executed is also referred to as "first copy mode".

The "simple copy" in FIG. 5 indicates a general copy mode that does not specifically limit the operation, and the "ID card copy" mode (the first copy mode) is used such that the front face and the rear face of a predetermined ID card such as the driving license are sequentially arranged in an A5-paper compatible read area and read, and read data elements are combined with the same magnification and printed on one side of the A4 paper. At the time of selecting the ID card copy mode, it is set such that a certain parameter is fixed so that it cannot be changed. In this way, in the first embodiment, a copy mode in which a certain parameter is preset can be easily selected to improve its usability. However, a parameter that can be freely selected by a user can be provided other than the fixed parameter according to the type of the user. Further, an image forming apparatus including only a single copy mode can be constituted depending on application.

Figure 6:
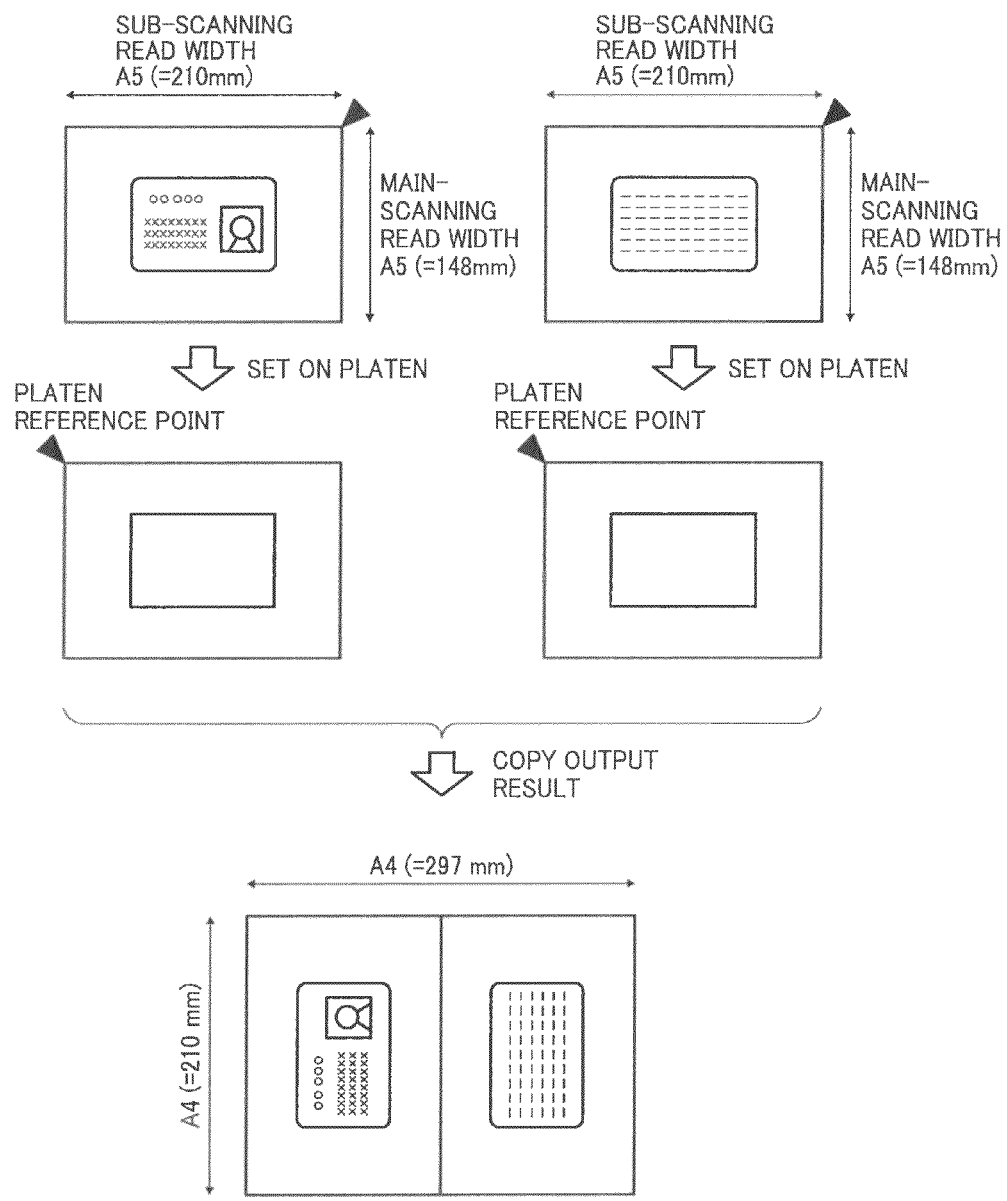
FIG. 6 is a schematic diagram of a process procedure in a first copy mode.

FIG. 6 is a schematic diagram of a procedure when the ID card is copied in the "ID card copy" mode. A user first selects the "ID card copy" mode. The user then places a front face side of an ID card such as a driving license to the original glass on the read area of the original glass. In the first embodiment, the ID card is placed in the A5-paper compatible read area. The A5-paper compatible read area has a size of 210 millimeters in a sub-scanning read width and 148 millimeters in a main scanning read width as shown in FIG. 6. When the ID card is placed and a read start instruction is input, the image forming apparatus 10 reads the image of the front face of the ID card and accumulates the read data. The user then places the rear face of the ID card to the original glass on the read area of the original glass to input the read start instruction. The image forming apparatus 10 reads the image of the rear face of the ID card and accumulates the read data in the same manner. When image data elements of the front face and the rear face are accumulated, the image forming apparatus 10 combines two image data elements with the same magnification and arranges the combined image data elements in an area corresponding to an A4 paper sheet, to print the image data. The copy finally obtained is such that the front face and the rear face of the ID card are arranged side by side on A4 paper (210 mm×297 mm) (see FIG. 6). A partition line can be printed between the respective originals.

Figure 7:
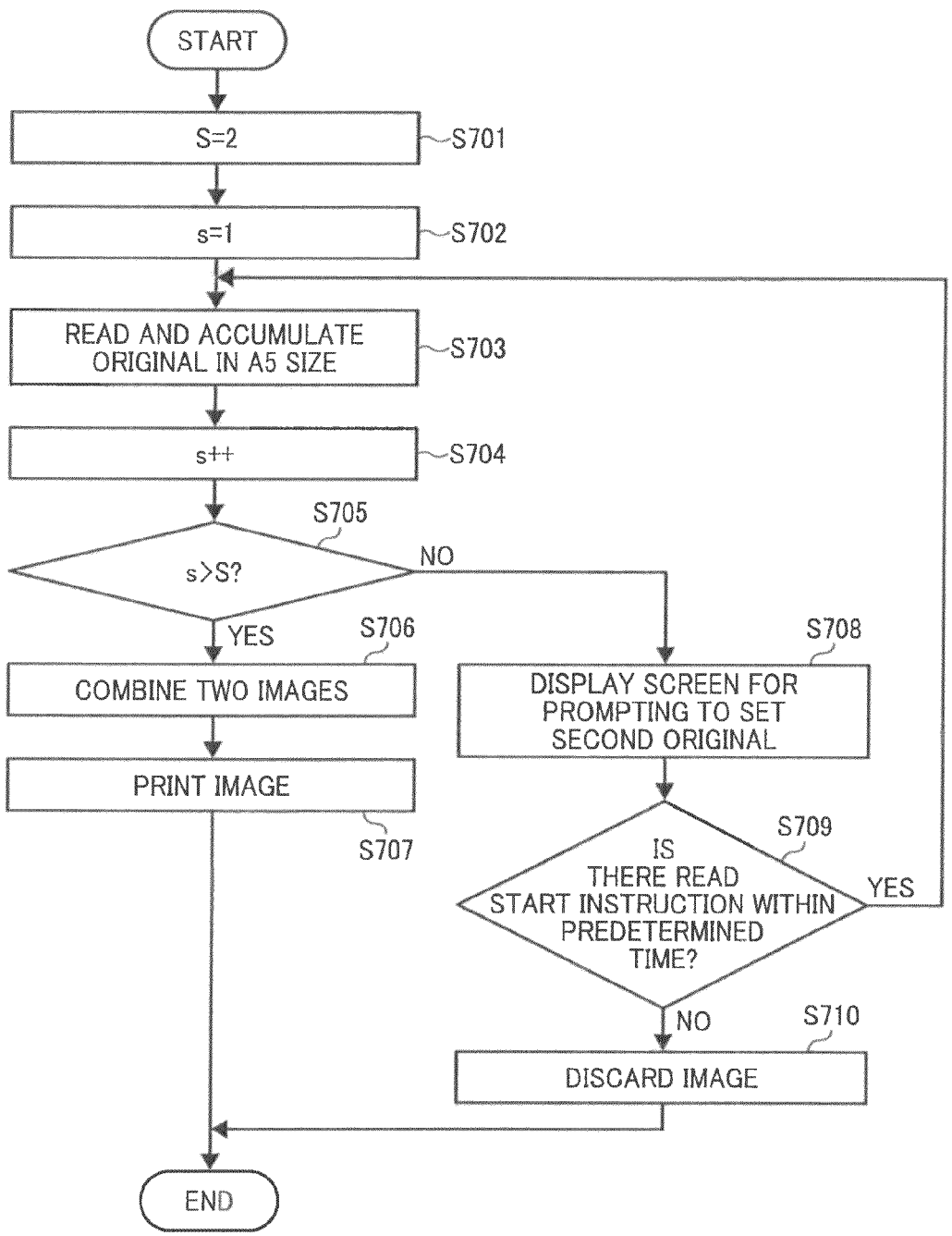
FIG. 7 is a flowchart of the process procedure in the first copy mode.

A copying process procedure in the "ID card copy" mode is explained in detail with reference to a flowchart in FIG. 7. When a user selects the "ID card copy" mode on the operating unit 111 and presses the start key 505, the ID-card copying process in FIG. 7 is started. First, at Step S701, a total number S of ID cards to be read is set to two. The total number S of ID cards to be read is a sum total of faces of the read ID cards. Next, at Step S702, a number s of ID cards to be read is set to one. The number s of ID cards to be read indicates how manieth a read process to be performed next is. When the number s of ID cards to be read is set, the original is read and accumulated at Step S703. As described above, in the first embodiment, the respective faces of the ID cards are read in the A5-paper compatible read area. When one face has been read and accumulated, the number s of ID cards to be read is incremented (Step S704). The incremented number s of ID cards to be read is compared with the total number S of ID cards to be read (Step S705). When the incremented number s of ID cards to be read is larger than the total number S of ID cards to be read (YES at Step S705), because the required read is completed, data elements of the read two images are combined (Step S706) to print the image (Step S707), and finishes the process. The printout in this case is the same as that shown in FIG. 6.

Figure 8A:
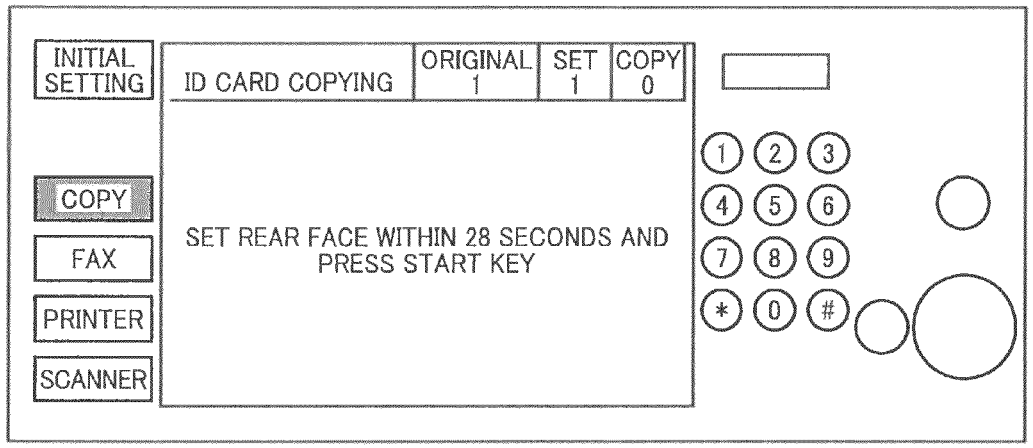
FIG. 8A is an example of a display unit during processing in the first copy mode.

On the other hand, when the incremented number s of ID cards to be read is not larger than the total number S of ID cards to be read (that is, s and S are equal: NO at Step S705), because the second original has not been read and accumulated yet, a screen for prompting to set the second face (rear face) of the ID card is displayed on the display unit 502 (Step S708). At this time, a message as shown in FIG. 8A is displayed on the display unit 502. Counting for a predetermined time (for example, 30 seconds) is started upon display. When there is the read start instruction of the rear face within the predetermined time (for example, when the user presses the start key 505) (YES at Step S709), control returns to Step S703, and an image of the rear face is read from the A5-paper compatible read area to accumulate the image data. When the number s of ID cards to be read is increased at the time of finishing read and accumulation of the front face and the rear face of the ID card (Step S704), because s=3>S (YES at Step S705), the data elements of the two images are combined (Step S706) to print the image (Step S707), and the process is finished. The printout in this case is the same as output shown in FIG. 6.

Figure 8B:
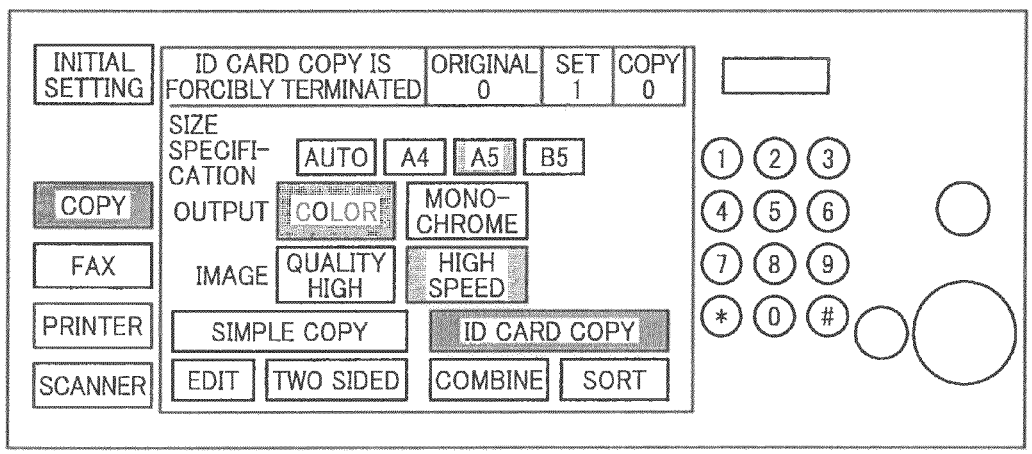
FIG. 8B is another example of the display unit during processing in the first copy mode.

At Step S709, when there is no read start instruction of the rear face within a predetermined time (for example, when a user does not press the start key 505 and leave it unpressed) (NO at Step S709), the read and accumulated first image is discarded (Step S710), and the process is finished. In this case, there is no printout, and because it is informed that the image is discarded and the process is finished, a message indicating that "ID card copy is forcibly terminated" or the like is displayed on the display unit 502 as shown in FIG. 8B.

When a copy of an ID card or the like is required for personal authentication, there are many cases that the personal authentication is accepted only when the front face and the rear face thereof are presented. For example, when a driving license is used for personal authentication, even when there is no description on its rear face, a copy of the rear face is required for certifying that there is no change of the holder's address or the like. In this case, differently from normal combined copying, printing only of the front face and printing only of the rear face are meaningless. Therefore, when the data of only one face can be obtained, printout is not performed, and the data is discarded. Accordingly, output of incomplete copy is prevented, and leakage of personal information and wasteful use of paper can be prevented at the same time.

A predetermined time for setting an original and a read start instruction can be changed within a reasonable range, or can be changed only by a user who has an administrative right.

In the first embodiment described above, the image forming apparatus corresponding to a case that printing of a front face and a rear face of an ID card is always required has been explained. However, it is convenient if it can be permitted to print only one side according to need of a user. According to the circumstances, there will be no problem if copy of a rear face is omitted by confirming that there is no description thereon, for example, when copy for personal authentication is made only by a reliable shop assistant or the like. In such a case, printing of only one side can be permitted for saving ink or the like. Therefore, processing in this case is explained as a modification of the first embodiment, with reference to a flowchart in FIG. 9.

Figure 9:
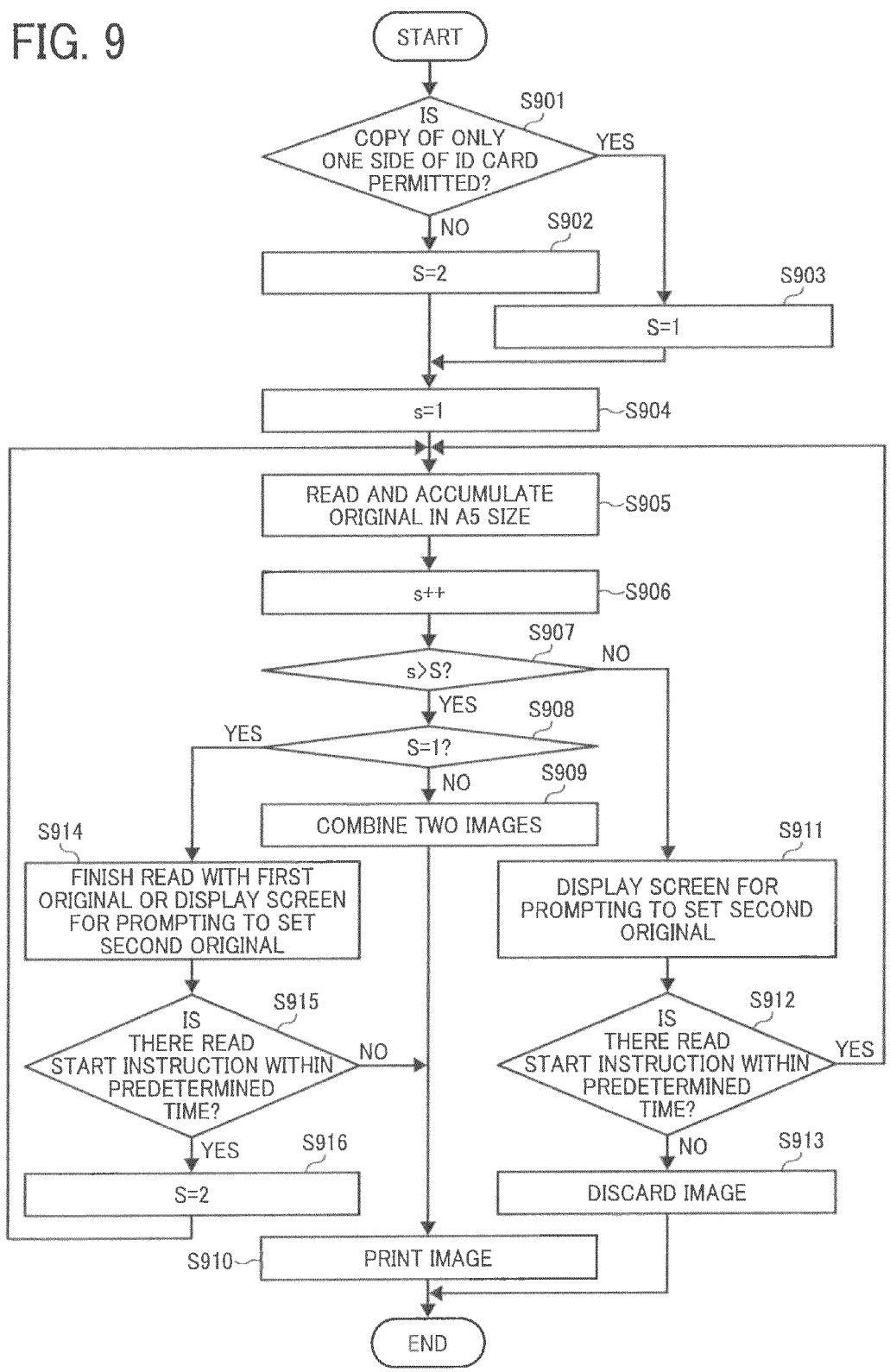
FIG. 9 is a flowchart of a process procedure in a first modification of the first embodiment.

In FIG. 9, when the "ID card copy" mode is selected, it is determined whether copy of only one side of the original is permitted (Step S901). With regard to whether copy of only one side of the original is permitted, the image forming apparatus itself can be set fixedly, it can be selected at an initial setting, or only a user having an administrative right can change the setting.

When copy of only one side is not permitted (NO at Step S901), the process same as that shown in FIG. 7 is performed thereafter (Steps S902, S904 to S913; in this case, always NO at Step S908). On the other hand, when copy of only one side is permitted (YES at Step S901), the total number S of ID cards to be read is set to one (Step S903). The total number s of ID cards to be read is then set to one (Step S904), and the original in the A5-compatible read area is read and accumulated (Step S905). When the number s of ID cards to be read is incremented (Step S906), because s=2 and S=1, s is larger than S as they are compared (YES at Step S907). Further, because S=1, determination at Step S908 becomes YES.

Even when copy of one original is permitted, copy of the second original does not need to be prohibited. When it is YES at Step S908, control proceeds to Step S914, where a screen for prompting to select whether read is finished with the first original or the second original is to be set is displayed on the display unit 502 (Step S914). While the display in this case is the same as that of FIG. 8A, a message such as "press # key when only front face is copied" is additionally displayed. Like Step S709 in the process shown in FIG. 7, when there is a read start instruction within a predetermined time (YES at Step S915), the total number S of ID cards to be read is reset to two, and control returns to Step S905 (Step S916). When there is no read start instruction within the predetermined time (including a case that there is a read completion instruction (when the # key has been pressed); NO at Step S915), it is determined that the read is complete. In this case, because the read image is for one original, combination of images is not required, and the read image is printed as it is (Step S910) and the process is finished.

Figure 10:
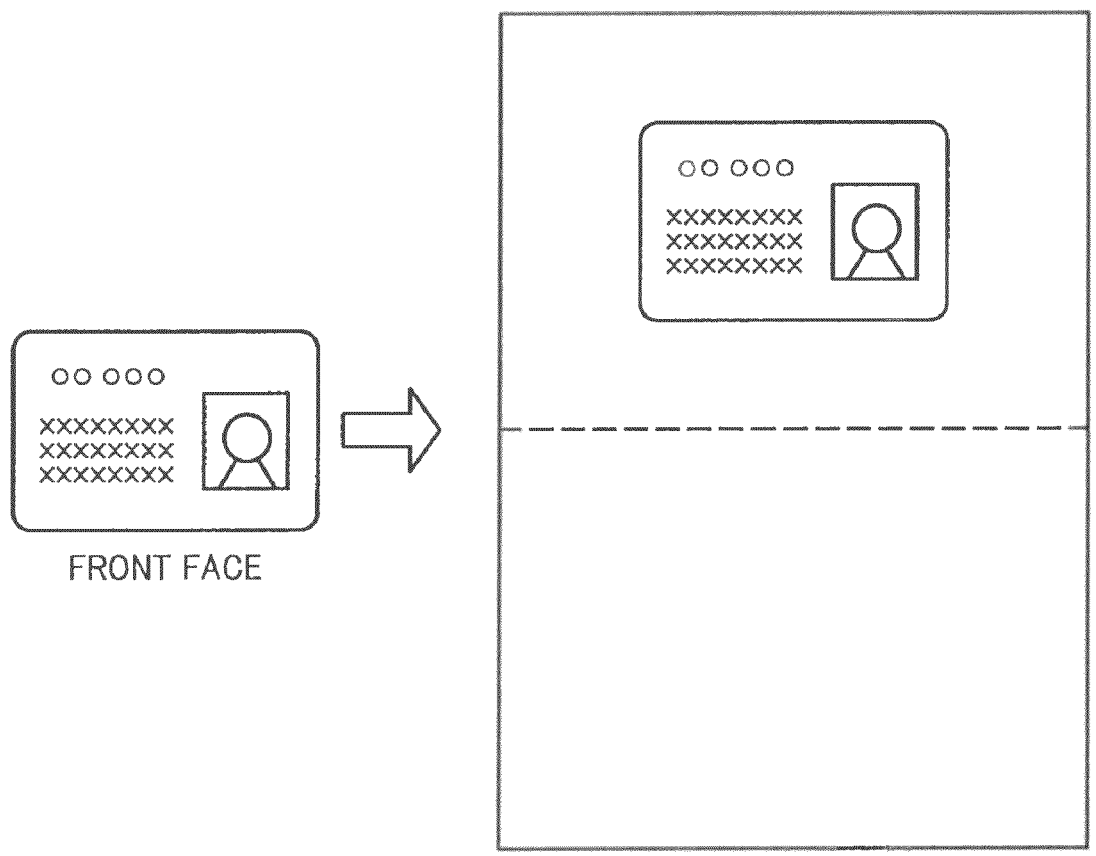
FIG. 10 is an example in which only one side of an ID card is printed in the first modification of the first embodiment.

When the copy of one original is printed and output, a blank page image can be prepared and combined with the copy of the original. The image to be printed in this case is as shown in FIG. 10. In this case, if it is NO at Step S915, control proceeds to Step S909 in the process shown in FIG. 9.

By arranging the above configuration, correspondence becomes possible for a case that the number of the face of the original required to be printed is only one. When the ID card is a driving license, because its rear face is for remarks, printing thereof is not needed as far as there is no particular matter. In this case, only one side needs to be printed by the modification described above. In the modification, because a user can fix printing of only one side, a part corresponding to the rear face can be made blank, and it can be confirmed that only the front face is a valid face. Further, because wasteful printing can be prevented, waste of toner and ink can be prevented and output speed can be improved.

In the first embodiment, the image forming apparatus that economically performs combined copying of a front face and a rear face of an ID card with the same magnification has been explained. However, there can be cases that not only a front face and a rear face of an ID card but also complementary information need to be copied together. An image forming apparatus that performs combined copying of a front face and a rear face of an ID card with the same magnification on one side of a sheet of copying paper, and copies supplemental information on the other side of the sheet without performing a combining process is explained as a second embodiment of the present invention. Such type of copying process is referred to as a second copy mode.

Figure 11:
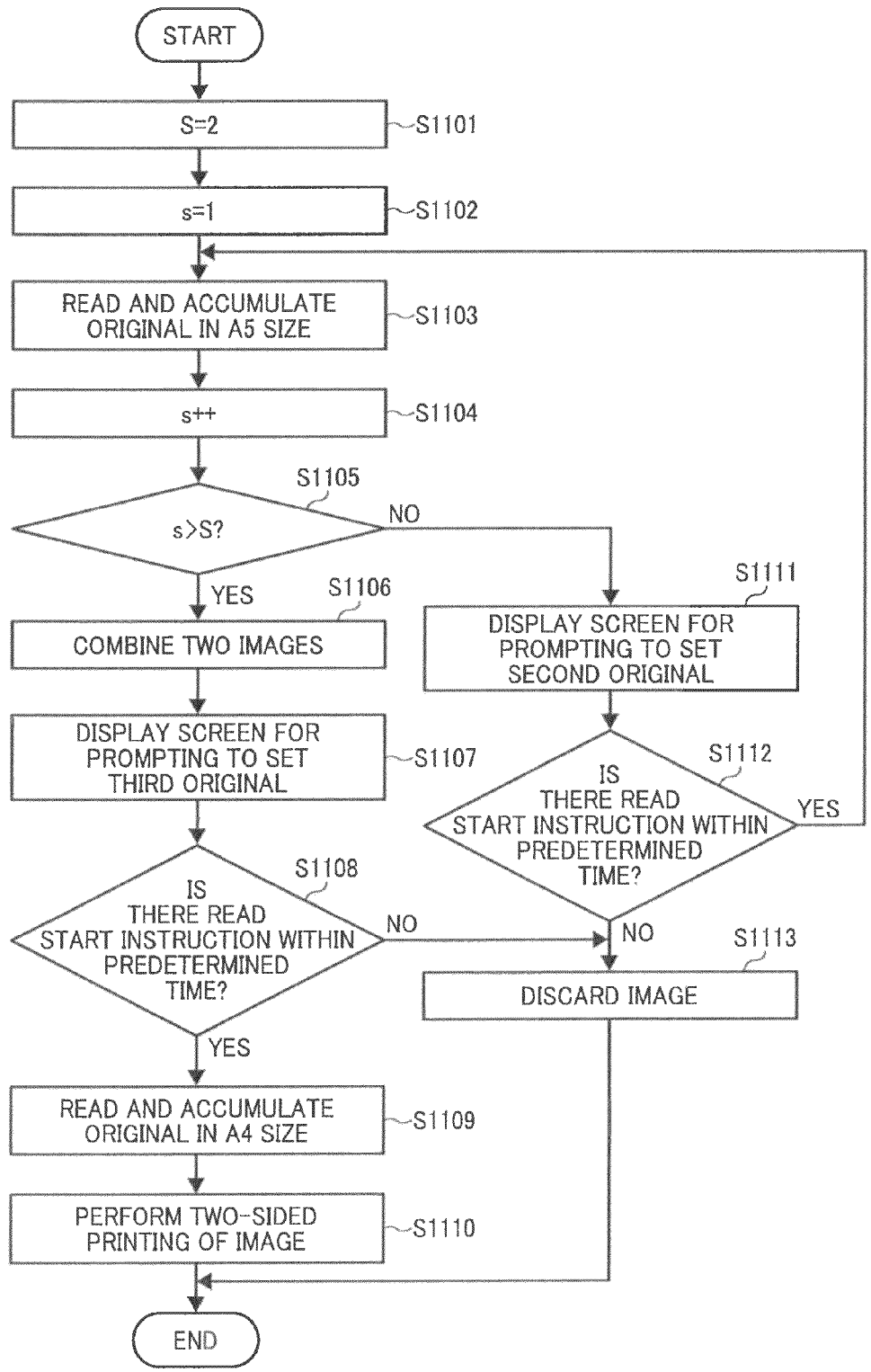
FIG. 11 is a flowchart of a process procedure in a second copy mode according to a second embodiment of the present invention.

FIG. 11 is a flowchart of an ID-card copying process in the second copy mode. In FIG. 11, a process from Steps S1101 to S1106 and a process from Steps S1111 to S1113 are the same as that from Steps S701 to S706 and that from S708 to S710 in FIG. 7. In the process shown in FIG. 11, a process after obtaining images of a front face and a rear face of an ID card and combining these images (Steps S1107 to S1110) is different from the process in FIG. 7.

After the images of the front face and the rear face of the ID card are obtained and combined (Step S1106), the display unit 502 displays a message prompting to set a third original on the original glass (Step S1107). The message to be displayed on the display unit 502 at this time is the same as that shown in FIG. 8A, and for example, "Set supplemental document within 30 seconds, and press start key" is displayed.

Figure 12:
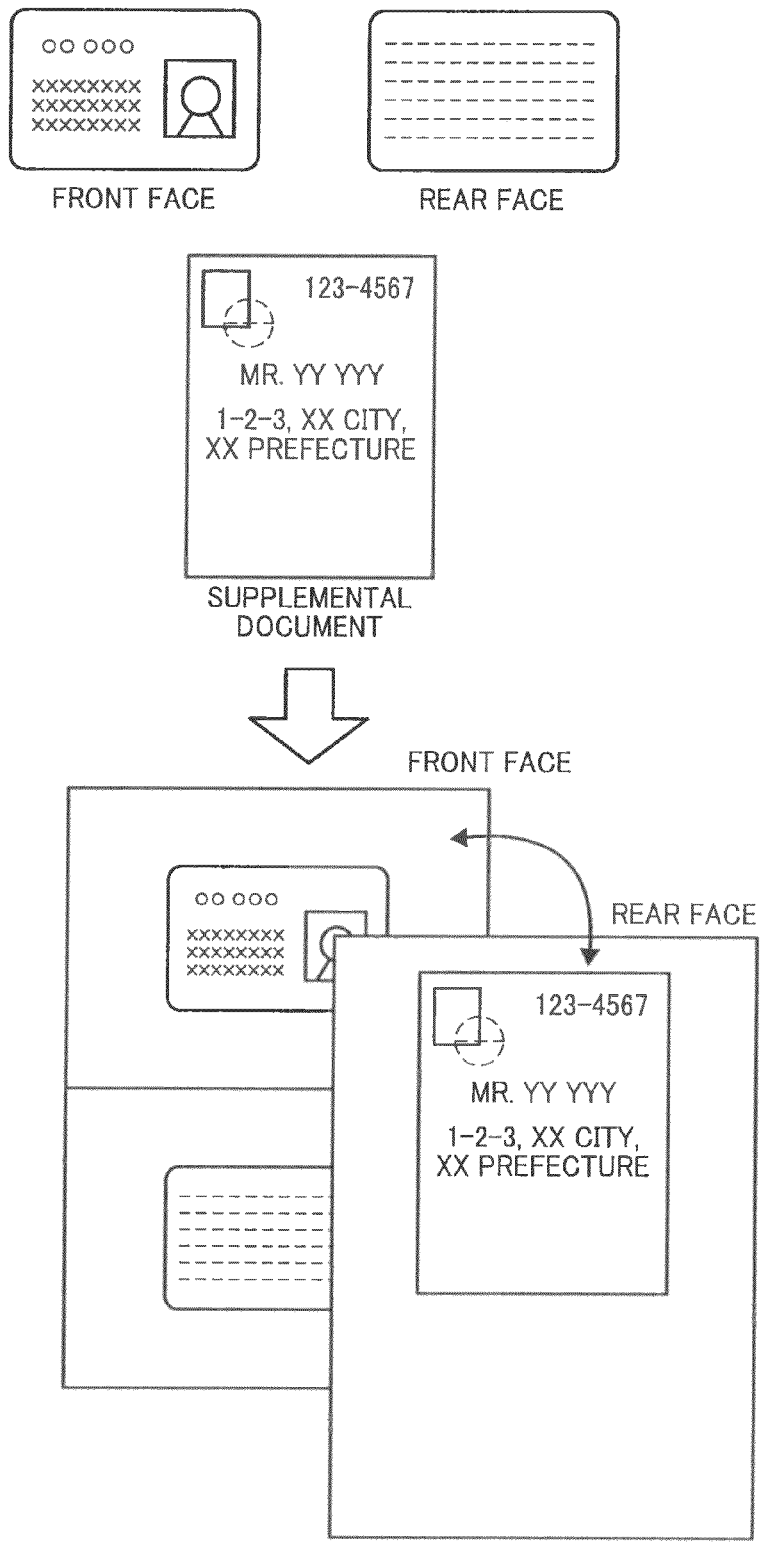
FIG. 12 is an example in which an ID card and a supplemental document are output in the second embodiment.

When there is a read start instruction of the supplemental document within a predetermined time (for example, a user presses the start key 505) (YES at Step S1108), the supplemental document is read from the A4-compatible read area and the image data is stored (Step S1109). Image data elements read from the front face and the rear face of the ID card are combined with the same magnification and printed on one side of a sheet of copying paper, and image data read from the supplemental document is printed on the other side of the sheet (Step S1110), and the process is finished. In this case, the image data combining the front face and the rear face of the ID card, and the image data of the supplemental document are printed in A4 size. An example of the printed data is shown in FIG. 12.

When there is no read start instruction of the supplemental document within the predetermined time (NO at Step S1108), the accumulated image is discarded (Step S1113), and the process is finished without printing. In this case, a message such as "copy of ID card and supplemental document is forcibly terminated" is displayed on the display unit 502.

The supplemental document to be processed in the second copy mode includes a document for supplementing personal authentication other than an ID card. For example, after an address of a holder of the ID card has been changed, if the driving license for which an address changing procedure has not been finished yet is presented as the ID card, it can be considered that a mail correspondence posted to a new address or a document such as a residence certificate of the new address is copied together as the supplemental document to officially confirm the new address. In other cases, for example, when there is a case that presenting only an ID card is not sufficient for personal authentication, convenience can be improved by printing the supplemental document together. Further, in the second copy mode, the front face and the rear face of the ID card are copied on one side of a sheet of copying paper, and the supplemental information is copied on the other side thereof. Therefore, necessary pieces of information can be collected on a sheet of paper, thereby enabling to facilitate management of personal information.

Further, because the read area of the supplemental document is set to A4 size, a residence certificate, which is normally in A4 size, can be read reasonably, and up to four sheets of a post card size can be read at once.

In the second embodiment described above, a process is performed in the second copy mode in which a supplemental-document copying process is serially added to the first copy mode described in the first embodiment. That is, after image data elements of a front face and a rear face of an ID card are accumulated, it is instructed whether to perform copy of a supplemental document. However, instead of such a configuration, the configuration can be made such that the first copy mode is set to default, and the copy mode is changed to the second copy mode only when a predetermined instruction is input.

Figure 13:
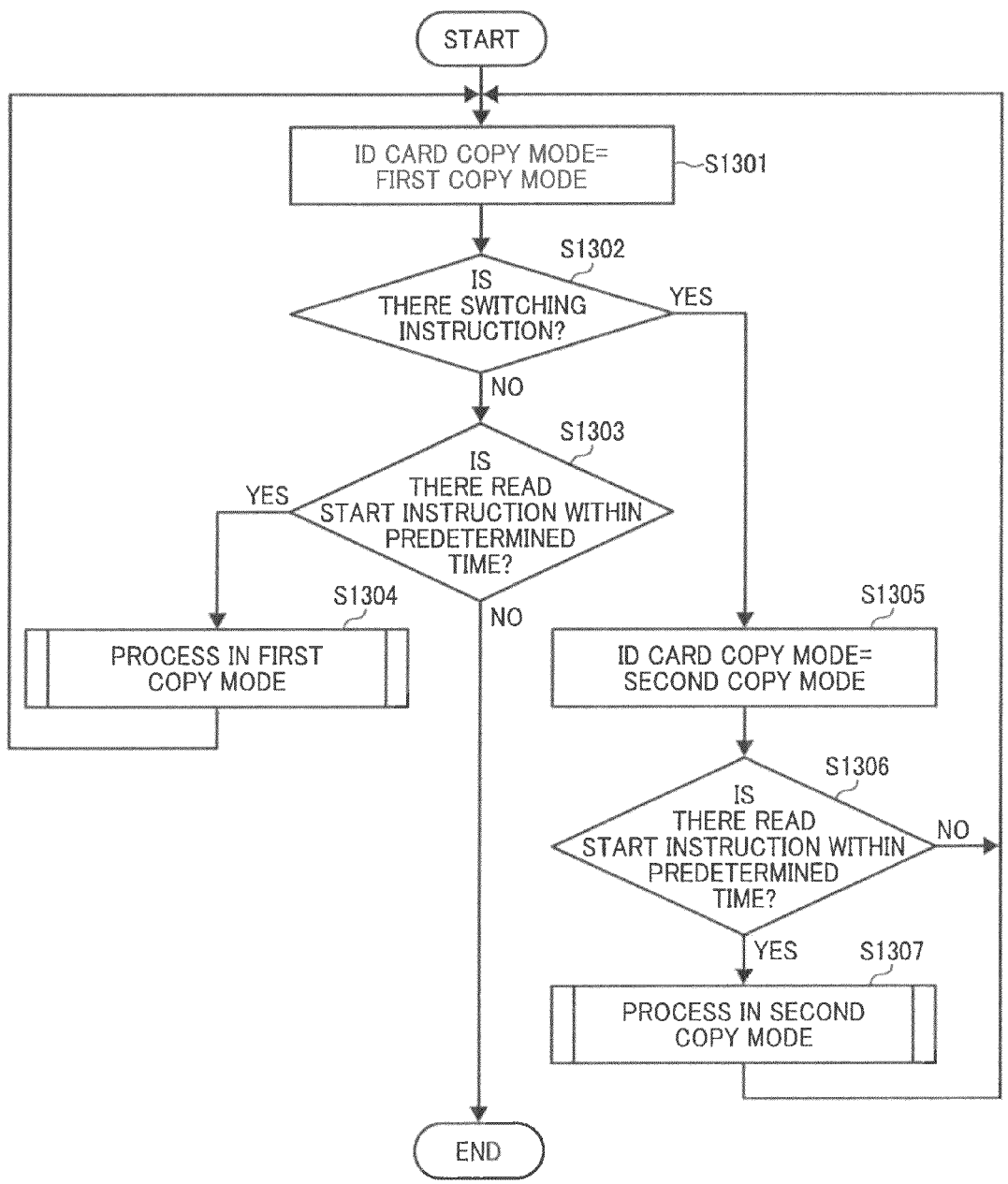
FIG. 13 is a flowchart of a process procedure in a first modification of the second embodiment.

An example of a process in such a configuration is shown in a flowchart in FIG. 13. When a user selects an "ID card copy" mode via the display unit 502, the process is started. When the "ID card copy" mode is started, the first copy mode is automatically set (Step S1301). An instruction input for switching to the second copy mode can be realized in various manners; however, it is desired that switching can be easily performed for improving operability. Specifically, an instruction is input by pressing a preset key or the like. For example, after the "ID card copy" mode has been started, a switching instruction to the second copy mode is performed by pressing a * key. At this time, the display unit 502 displays a message such as "in case of copying by ID card and supplemental document mode, press * key" to prompt a switching instruction. When there is no switching instruction (NO at Step S1302), and when there is no copy start instruction within a predetermined time (NO at Step S1303), the process is finished. Termination of the process in this case is realized by a conventional "auto clear" function or the like. Even when a mode other than the ID card copy mode is selected or another function is selected, this selection becomes a trigger to finish the ID card copy mode. When there is a copy start instruction within the predetermined time (YES at Step S1303), a process by the first copy mode shown in FIG. 7 is started (Step S1304). When the process by the first copy mode is finished, control returns to Step S1301.

When there is a switching instruction (YES at Step S1302), the copy mode is switched to the second copy mode (Step S1305). When there is no copy start instruction within the predetermined time (NO at Step S1306), control returns to Step S1301. In this case, the process can be finished like in the case that there is no copy start instruction at Step S1303. When there is the copy start instruction within the predetermined time (YES at Step S1306), the display unit 502 displays a message such as "ready to copy". At this time, a display of the "ID card copy" (see FIG. 5) is changed to an "ID card copy (+supplemental document)" or the like for indicating a change of the copy mode. The ID-card copy process by the second copy mode shown in FIG. 11 is started (Step S1307). When the process at Step S1307 is finished, the display unit 502 displays a message such as "copy of ID card and supplemental document completed". Thereafter, control returns to Step S1301. When control returns to Step S1301, "ID card copy (+supplemental document)" on the display unit 502 is changed to the "ID card copy" for indicating that the copy mode has returned to the default.

In the first modification described above, the first copy mode is set to the default and the mode is automatically returned to the first copy mode after executing the second copy mode, based on an assumption that the first copy mode is more frequently executed than the second copy mode. The operability at the time of continuously executing the ID copy mode can be increased by having such a configuration. Under an environment that the second copy mode is more frequently executed than the first copy mode, the second copy mode can be set to the default.

Also in the second embodiment, a smaller number of printouts of image data of the original than a specified number can be permitted as in the modification of the first embodiment.

In addition, changes described below can be added to each of the first and second embodiments.

As for a front face including a photograph of an ID card such as a driving license, color copy is preferable. However, there are cases that black and white copy is sufficient for the rear face thereof. In such a case, only a necessary page is printed in color, thereby enabling to prevent waste of toner and ink. This is explained below as a second modification.

For example, in a flowchart shown in FIG. 11, such a modification can be applied that the front face of the ID card is read in color and the rear face and supplemental information are read in black and white. That is, when the front face of the ID card is read at Step S1103, it is initially set to read the ID card in color. When control returns to Step S1103 in the case of YES at Step S1112 (when the rear face of the ID card is to be read), it is set to read the ID card in black and white. When the supplemental information is read at Step S1109, it is initially set to read the information in black and white.

When it is predetermined whether to read the ID card in color or in black and white depending on a processing content, even when a color start key and a monochrome start key are provided in the operating unit 111, these keys are controlled to function as a simple start key.

In such a configuration that switching between monochrome and color is performed by another key different from the start key, a user can provide an instruction different from a default setting of the copy mode to perform switching between color and monochrome according to the instruction.

A charging system specific to the function of the image forming apparatus 10 can be applied as an operation of the charging unit 109 shown in FIG. 1. This is explained below as a third modification.

Figure 14:
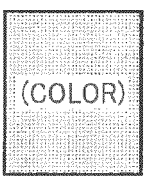
FIG. 14 is an example of a charging system of an image forming apparatus.

In the image forming apparatus 10 according to the second modification, a color area and a monochrome area are clearly distinguished in a sheet of paper. Not only the size of the input original but also color and monochrome outputs can be distinguished to change a charged amount. As shown in FIG. 14, for example, when the input original and an output sheet are both A4 size, color copy is set to ¥20, and monochrome copy is set to ¥10. When an A5 size input original is subjected to combined copying and output in an A4 size, color copy is set to ¥10, and monochrome copy is set to ¥5 per one A5 input original. Specifically, when only a front face of an ID card is subjected to combined copying and printed in color, the amount is ¥10 because it is only one A5 color input. When both sides of the ID card are subjected to combined copying and printed in color, the amount is ¥20 because of two A5 color inputs. When the both sides of the ID card are subjected to combined copying, with the front face being printed in color and the rear face being printed in monochrome, the amount becomes ¥10+¥5=¥15, because there are one A5 color input and one A5 monochrome input. When the both sides of the ID card and a supplemental document are subjected to combined copying and printed in color, the amount becomes ¥10×2+20=¥40, because there are two A5 color inputs and one A4 color input. When the both sides of the ID card and a supplemental document are subjected to combined copying, with the ID card being subjected to combined copying, and only the front face of the ID card being printed in color, the amount becomes ¥10+5+10=¥25, because there are one A5 color input, one A5 monochrome input, and one A4 monochrome input.

Thus, appropriate charging can be performed by charging according to the sheet size and color or monochrome.

Figure 15:
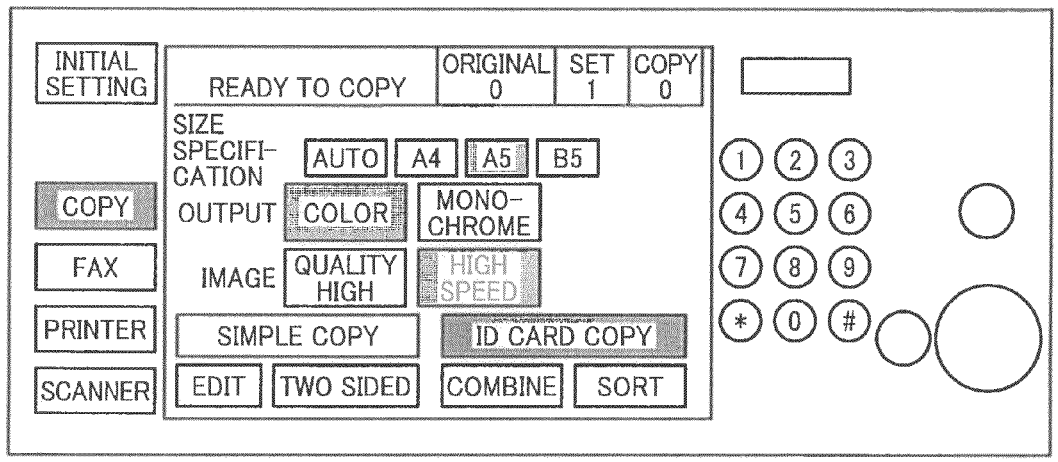
FIG. 15 is an example of a display screen when test copy is prohibited while an ID card copy mode is selected.
Figure 15:
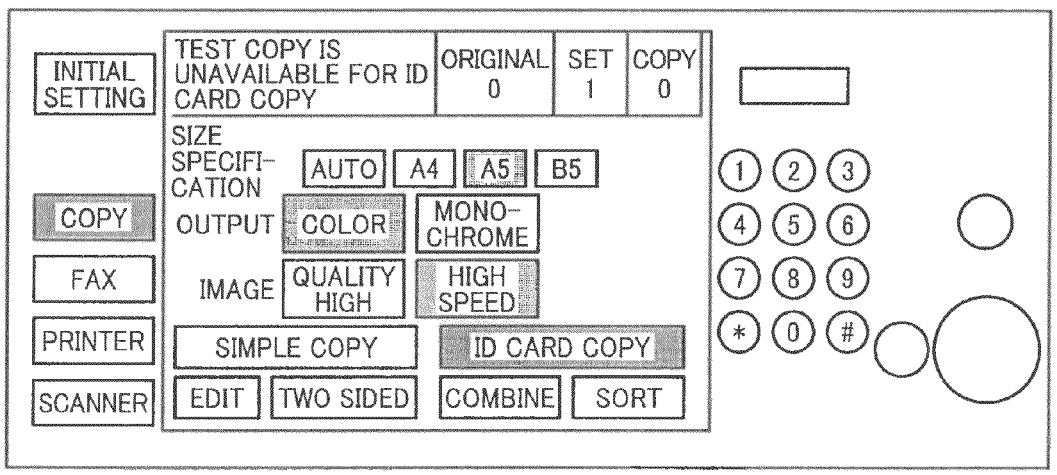

As shown in FIG. 5, the operating unit 111 can include the test copy key 508. Normally, when the test copy key 508 is pressed, it is set to execute copy of only one sheet for confirming an output result. On the other hand, when the ID card copy mode is selected, the test copy key 508 can be invalidated. This is explained below as a fourth modification. In this case, as shown in FIG. 15, when the test copy key 508 is pressed, a message indicating that the test copy key cannot be used is displayed on the display unit 502. When the image forming apparatus that executes only the ID card copy mode is used, the test copy key 508 itself can be omitted.

Conventional image forming apparatuses can be set such that a test copy function is validated only when sort is selected. Accordingly, the test copy key is invalidated when stack is selected. In the first and second embodiments described above, because the ID card copy mode is configured as a mode for performing printout on a sheet of paper, it can be considered to automatically select stack in the ID card copy mode. Thus, when a combination of ID card copy and sort cannot be realized, prohibition control of the test copy is not particularly required.

Figure 16:
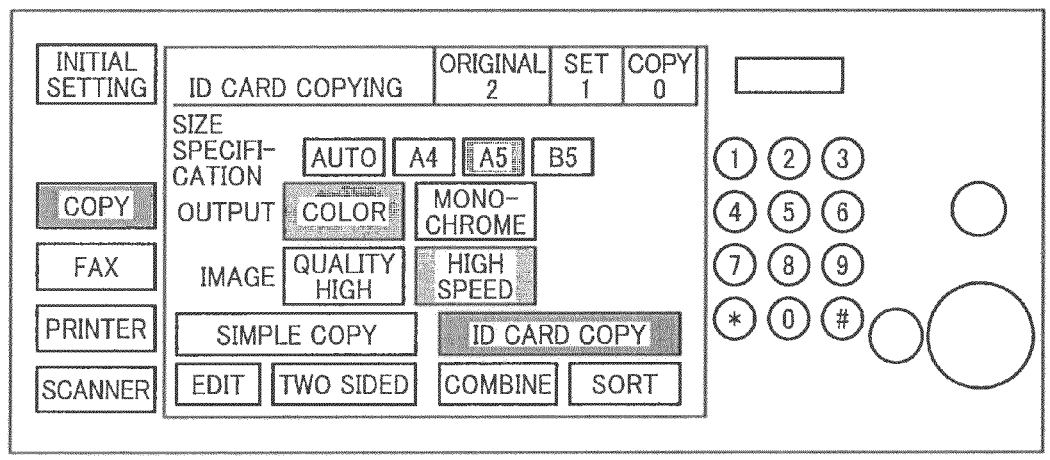
FIG. 16 is an example of a preview-image display screen.
Figure 16:
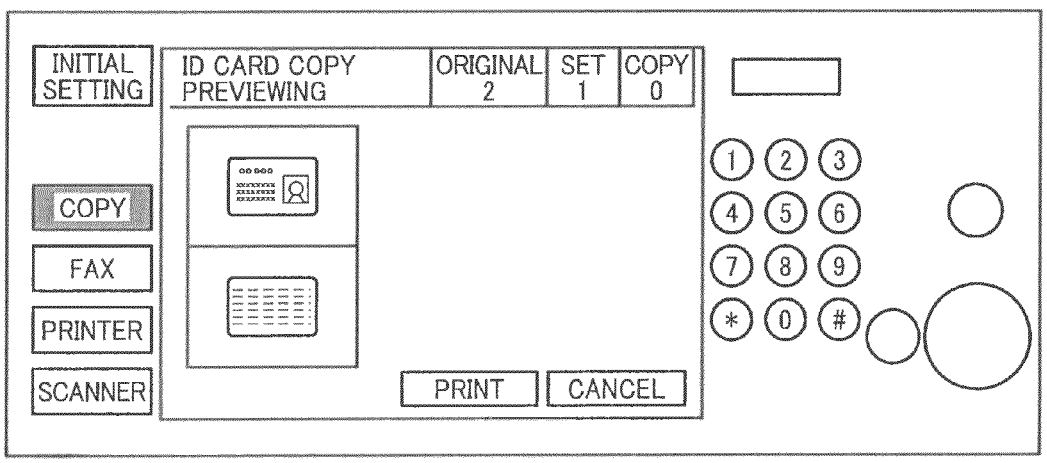

As in the fourth modification described above, when the test copy key 508 is invalidated at the time of selecting the ID card copy mode, an output image cannot be confirmed. Therefore, the display unit 502 can display a preview. This is explained below as a fifth modification. At the time of selecting the ID card copy mode, a preview image is displayed on the display unit 502 after read and before printout, and it can be selected whether the image is output from a preview-image display screen or printout is cancelled (see FIG. 16).

Only when it is confirmed by the preview screen that printout capable of performing personal authentication accurately is performed, an image is actually printed, thereby enabling to prevent leakage of private information due to unnecessary printing and to prevent wasteful use of paper.

In this case, a key for instructing preview display can be separately provided, or pressing of the test copy key 508 can function as a trigger of the preview image display at the time of selecting the ID card copy mode. Then, the preview image is not always displayed before printing, but is displayed only when the user wishes the preview image.

The user can select whether to display the preview image at all times at the initial setting or the like. It can be set such that the preview image is displayed only for a predetermined time, and when there is no instruction within the predetermined time, printing of the displayed preview image is cancelled and the image is discarded. Such a configuration is desired in view of security. The time for preview display can be set according to performance or function of the display unit or can be changed by the user. The preview function can be used more effectively according to such a configuration.

The image forming apparatus according to the first and second embodiments can be realized by a hardware configuration of a general computer (partially shown in FIG. 1) including a controller such as a CPU, a memory device such as a ROM or a RAM, an external memory device such as a hard disk drive (HDD) or a compact disk (CD) drive, a display unit such as a display device, and an input unit such as a keyboard or a mouse.

An image forming program executed by the image forming apparatus according to the first and second embodiments can be recorded on a computer readable recording medium such as a CD-ROM, a flexible disk (FD), a CD recordable (CD-R), or a digital versatile disk (DVD) in an installable or executable format file.

The image forming program executed by the image forming apparatus according to the first and second embodiments can be stored on a computer connected to a network such as the Internet, and downloaded through the network to be provided. Alternatively, the image forming program executed by the image forming apparatus according to the first and second embodiments can be provided or distributed through a network such as the Internet.

The image forming program according to the first and second embodiments can be stored in a ROM or the like in advance and provided.

The image forming program executed by the image forming apparatus according to the first and second embodiments has a module configuration including the respective units (the reading unit, the accumulating unit, and the combining unit) described above. As actual hardware, a CPU (processor) reads the image forming program from the recording medium and executes the image forming program to load the respective units onto a main memory, so that the reading unit, the accumulating unit, and the combining unit are created on the main memory.

According to one aspect of the present invention, when originals including personal information are subjected to combined copying, already read and accumulated image data is discarded and the process is cancelled, unless read of a desired number of originals is complete. Accordingly, an unnecessary copy including the personal information can be avoided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a reading unit that electronically reads an original that is placed on a platen;
    an accumulating unit that accumulates image data of the original read by the reading unit;
    an output unit that prints and outputs the image data according to a predetermined copy mode that specifies a total number of originals to be read;
    an input unit that receives an input of an instruction;
    a discard determining unit that discards the image data accumulated in the accumulating unit, when a total number of originals read by the reading unit is smaller than the total number of originals specified in the predetermined copy mode and the input unit does not receive an input of a read instruction within a predetermined time.

2. The image forming apparatus according to claim 1, wherein
    the predetermined copy mode is a first copy mode in which the total number of originals specified is two, and
    one-sided printing is performed by the output unit by combining image data of two originals with a same magnification.

3. The image forming apparatus according to claim 1, wherein
    the predetermined copy mode is a second copy mode in which the total number of originals specified is three, and
    a two-sided printing is performed by the output unit in such a manner that a first original and a second original are combined with a same magnification and printed on a first side of a printing sheet, and a third original is printed on a second side of the printing sheet.

4. The image forming apparatus according to claim 1, wherein the input unit further receives an input of a select instruction for selecting either one of a first copy mode in which the total number of originals specified is two and one-sided printing is performed by combining two originals with a same magnification, and a second copy mode in which the total number of originals specified is three and a first original and a second original are combined with a same magnification and printed on a first side of a printing sheet and a third original is printed on a second side of the printing sheet, as the predetermined copy mode.

5. The image forming apparatus according to claim 4, wherein
    when the input unit receives no input of the select instruction, the first copy mode is executed, and
    when the input unit receives an input of the select instruction, the second copy mode is executed, and thereafter the copy mode returns to the first copy mode.

6. The image forming apparatus according to claim 1, wherein
    the input unit receives an input of an output permission instruction for permitting a smaller number of printouts of image data than the total number of originals specified, and
    the image forming apparatus further comprises a discard-determination invalidating unit that invalidates the discard determining unit when there is an input of the output permission instruction.

7. The image forming apparatus according to claim 1, wherein the output unit includes a preview display unit that displays a preview of an image of the image data to be printed before printing the image data while the predetermined copy mode is being executed.

8. The image forming apparatus according to claim 1, wherein the output unit outputs, among the originals read by the reading unit, a first original in color and a second original and rest of the originals in monochrome.

9. The image forming apparatus according to claim 1, further comprising:
- a combining unit that combines the image data accumulated in the accumulating unit in a single printing sheet according to a predetermined copy mode that specifies in advance a total number of originals to be read; and
- a fee charging unit that charges a fee according to a number of originals read by the reading unit, depending on whether the combining unit combines the image data and whether the output unit outputs the image data in color or monochrome.

10. An image processing method, comprising:
reading electronically an original;
accumulating image data of the original read by the reading;
determining whether a total number of originals read has reached a total number of originals specified in a predetermined copy mode; and
discarding, when it is determined that the total number of originals read has not reached the total number of originals specified in the predetermined copy mode, if reading of another original is not performed within a predetermined time, the image data accumulated in the accumulating.

11. The image processing method according to claim 10, wherein
- the predetermined copy mode is a first copy mode in which the total number of originals specified is two,
- when it is determined that the total number of originals read has reached two, the combining includes combining image data of two originals with a same magnification,
- the method further comprising printing the image data combined with the same magnification on one side of the printing sheet.

12. The image processing method according to claim 10, wherein
- the predetermined copy mode is a second copy mode in which the total number of originals specified is three,
- when it is determined that the total number of originals read has reached three, the combining includes combining image data of a first original and a second original with a same magnification without combining image data of a third original, and
- the method further comprising printing the image data of the first original and the second original combined with the same magnification on a first side of the printing sheet and the image data of the third original on a second side of the printing sheet.

13. The image processing method according to claim 10, further comprising invalidating the determining by receiving an output permission instruction for permitting a smaller number of printouts of image data than the total number of originals specified are permitted through an inputting.

14. The image processing method according to claim 10, further comprising:
outputting, among the originals read, a first original in color and a second original and rest of the originals in monochrome.

15. The image processing method according to claim 10, further comprising:
- combining, when it is determined that the total number of originals read by the reading unit has reached the total number of originals specified in the predetermined copy mode, the image data accumulated in the accumulating in a single printing sheet according to the predetermined copy mode; and
- fee charging a fee according to a number of originals read, depending on whether the combining combines the image data and whether the image data is output in color or monochrome.

16. A computer program product comprising a non-transitory computer-usable medium having computer-readable program codes embodied in the medium for implementing an image processing method, comprising:
reading electronically an original;
accumulating image data of the original read by the reading;
determining whether a total number of originals read has reached a total number of originals specified in a predetermined copy mode; and
discarding, when it is determined that the total number of originals read has not reached the total number of originals specified in the predetermined copy mode, if reading of another original is not performed within a predetermined time, the image data accumulated in the accumulating.

* * * * *